April 7, 1970  D. R. DEWEY II  3,504,381
TOILET BOWL
Filed Feb. 21, 1968

INVENTOR
DAVIS R. DEWEY II
BY
Crowley, Kiely & Stevens
ATTORNEYS

United States Patent Office 3,504,381
Patented Apr. 7, 1970

3,504,381
TOILET BOWL
Davis R. Dewey II, R.F.D. 1, Old Winter St.,
Lincoln, Mass. 01773
Filed Feb. 21, 1968, Ser. No. 707,121
Int. Cl. E03d 11/13; B64d 11/02
U.S. Cl. 4—76                                  3 Claims

ABSTRACT OF THE DISCLOSURE

A self-contained disposal system which includes a toilet bowl the inner surface of which is coated with a fluorocarbon material which material has a very low adhesion for waste materials. A flush water tank and a waste storage tank are used respectively to introduce flush materials into the toilet bowl and to store the waste and flush materials removed from the bowl.

Background of the invention

It is customary to make toilet bowls, bed pans, urinals and other related articles for the disposal of waste material of metals such as stainless steel, or of vitreous material such as porcelain. A portion of the waste materials which enter these recepticles often adheres to the surface to some degree or permeates in the case of porcelain. This is obviously unsanitary and therefore such recepticles require frequent cleaning. Further, even in toilet bowls where a flushing of a bowl is generally made after each use there is always some waste material such as feces which would adhere to the bowl surface and even after repeated flushings waste material may eventually begin to build up or form an inventory on the portion of the surface which it contacts. This obviously necessitates frequent cleanings or repeated and wasteful flushing for its removal.

The problem of increased inventory of the waste material on the inner surface of the toilet bowl is particularly disadvantageous where it is impossible to clean the bowl frequently or where the water requirements for the flushing or cleaning are at a minimum. This is often the situation in self-contained units used in aircraft where the flush water may be separated from the solid or other waste material and recycled or where the water may be used once and then stored until it can be removed from the plane. Other current methods used are spraying jets of water on the surface or incorporating a disinfectant or cleaner into the flushing solutions.

Summary of the invention

My invention embodies coating or treating the surface of a toilet bowl or similar recepticle on all or a portion of such surface with a material to reduce the tendency of the solid waste material to adhere to such surface. If desired the bowl or similar recepticle may be formed from such material. Suitable resinous materials would include but not be limited to coating such with a thin coating of a fluorocarbon, silicone or other resinous material. In coating the surface of the toilet bowl with such materials there is no noticeable increase in inventory of undesirable material on the coated surface of the toilet bowl since the adhesive characteristics of the materials that I use are extremely low and accordingly there is negligible adhesion to or permeation into the bowl surface. Accordingly, cleaning requirements are significantly reduced with an improvement in sanitary conditions.

My invention in its most advantageous application is for use in a system in which the flush material is recycled or stored such as the use of toilet facilities in aircraft systems. My invention considerably reduces the quantity of water or solution required for flushing and minimizes the need for using strong disinfectants with the flushing material or jet spraying the flush water on the inside of the toilet bowl. The surface adhesive characteristics of the materials used in my invention minimize to a great degree the permeation and build-up of waste materials on the toilet bowl surface.

This type of self-contained disposal unit in addition to incorporation into aircraft may also be used in buses and boats. It has a large application in a pleasure craft since many of the sanitary requirements of lakes, rivers, streams and even bay areas require that pleasure boats now have the self-contained disposal units thereon, and that the use of a toilet which reduced the water requirements or the disinfectant requirements for said units would of course be advantageous.

Description of the preferred embodiments

Figure 1:
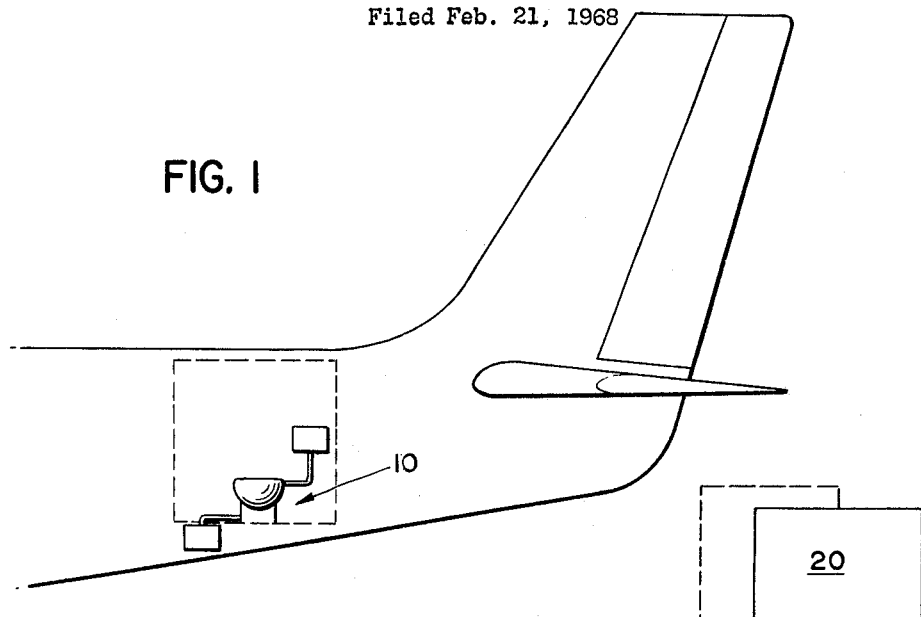
FIG. 1 is a schematic illustration of my invention.

In FIG. 1 my invention is shown incorporated into the rear portion of an aircraft.

Figure 2:
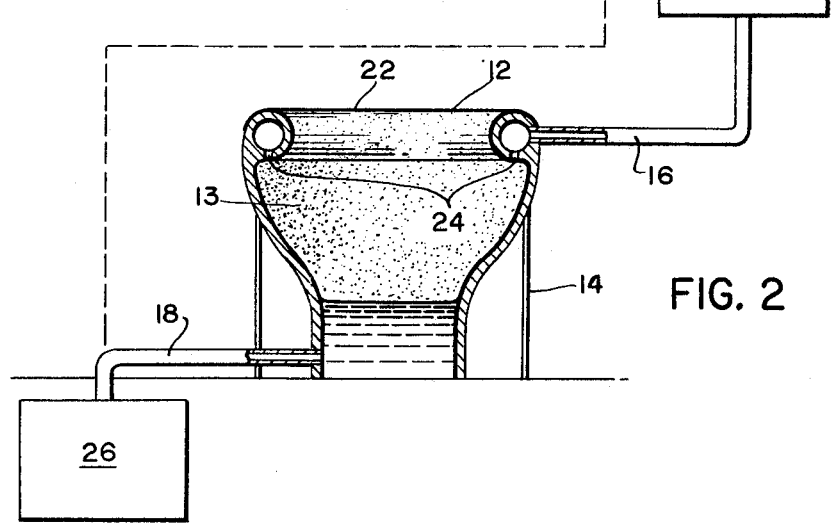
FIG. 2 is a schematic and partially across-sectional view of my invention.

FIG. 2 shows my invention in greater detail wherein my system comprises a bowl 12 having an inner surface 13 and support stand 14. A flush water inlet 16 is in communication with a flush water tank 20. A rim passage contour 22 extends around the upper edge of the bowl 10. The contour 22 has openings 24 for admitting flush water to the upper portion of the bowl 10. A flush water outlet 18 communicates between the lower portion of the toilet bowl and a storage tank 26 and the bowl is shown as partially filled with flush water. The inner surface 13 of the bowl 12 is entirely coated. However, it is obvious that in some applications it would only be necessary to coat certain portions of the bowl such as to a point slightly above the level of the water which is normally in the bowl.

The coating is a film forming solid resinous or polymeric fluorocarbon material such as "Teflon" a polytetrafluoroethylene resin. Other continuous polymeric film layers having relatively low surface adhesion, no stick characteristics, low coefficient of friction, very low permeability to moisture and little moisture absorption such as other fluorocarbons like fluorohydrocarbon resins such as fluoronated ethylene-propylene and mixed fluorochloroethylene resins, silicone resins, polyolefin resins and other similar materials may also be used.

In my system when it is desired to remove waste material the flush water from the tank 20 passes through the inlet 16 and into the rim contour 22. It is then discharged through the openings 24 onto the surface 13 of the toilet bowl and then through the outlet 18 and into storage tank 26.

An alternative embodiment of my invention is shown in FIG. 2 by the dotted line. In those systems where it is desirable to separate the waste material from the flush water then it is obvious that the flush material after separation may be recycled back to the storage tank 20.

Figure 3:
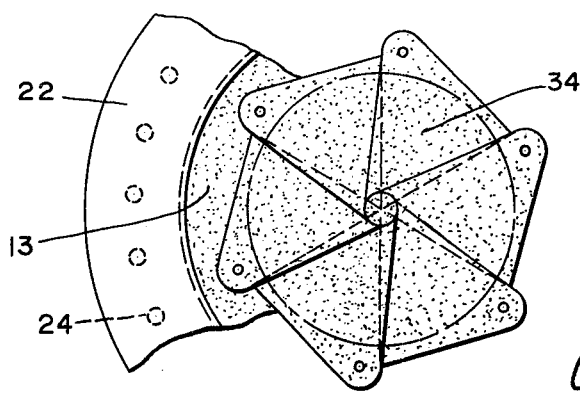
FIG. 3 is a schematic illustration of an alternative embodiment of my invention.

FIG. 3 shows a further alternative embodiment of my invention wherein a toilet bowl 28 has a retractable fan like diaphragm 30 disposed in the lower portion thereof. The coating is applied to the inner surface 13 and the diaphragm 34. If desired the diaphragm 34 may be made entirely from the fluorocarbon material.

Accordingly, my invention reduces water requirements and/or reduces the amount of disinfectant or detergent that would be required in a self-contained system.

Accordingly, what I claim is:

1. A self-contained disposal unit for use in an aircraft system which comprises in combination:
   (a) a receptacle having an exposed surface upon and through which waste material passes;
   (b) means to discharge a flush material onto the surface of the receptacle;
   (c) a source of flush material disposed upstream of the receptacle and in fluid flow communication with the means to discharge the flush material;
   (d) means to receive and to collect the flush material and the waste material disposed downstream of and in fluid flow communication with the receptacle; and
   (e) a coating of organic polymeric material disposed upon the exposed surface of the receptacle characterized by low surface adhesion, very low permeability to moisture and little moisture absorption whereby because of the surface characteristics of the coating the accumulation of the waste material collecting as inventory on the surface of the receptacle is minimized thereby improving sanitary conditions and the low adhesion of the coating provides for the rapid removal of waste material thereon which provides a self-contained disposal system wherein a minimum of flush material may be used within the system since waste material does not tend to accumulate on and adhere to the coating.

2. The apparatus of claim 1 wherein the organic polymeric material is a fluorocarbon material and which includes means to separate the flush material from the waste material and means to recirculate the separated flush material.

3. The apparatus of claim 2 wherein a retractable fan-like diaphragm is disposed within the receptacle, the fan-like diaphragm has an exposed surface and a coating of the fluorocarbon material is disposed on said surface.

References Cited

UNITED STATES PATENTS

| | | | |
|---|---|---|---|
| 1,303,358 | 5/1919 | Montgomery | 4—10 XR |
| 2,705,691 | 4/1955 | Panagrossi et al. | |
| 2,724,672 | 11/1955 | Rubin. | |
| 2,865,028 | 12/1958 | Patenaude | 4—10 |
| 2,879,519 | 3/1959 | Mueller | 4—10 |
| 3,024,468 | 3/1962 | Burn | 4—77 |
| 3,044,077 | 7/1962 | Belden | 4—10 |
| 3,079,612 | 3/1963 | Corliss | 4—10 |

LAVERNE D. GEIGER, Primary Examiner

H. K. ARTIS, Assistant Examiner

U.S. Cl. X.R.

4—10, 89, 92